US008910068B2

(12) United States Patent
Shin et al.

(10) Patent No.: US 8,910,068 B2
(45) Date of Patent: Dec. 9, 2014

(54) METHOD OF OPERATING A PORTABLE TERMINAL AND PORTABLE TERMINAL SUPPORTING THE SAME

(75) Inventors: Hyun Kyung Shin, Seoul (KR); Bong Won Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 544 days.

(21) Appl. No.: 12/776,619

(22) Filed: May 10, 2010

(65) Prior Publication Data

US 2010/0295805 A1 Nov. 25, 2010

(30) Foreign Application Priority Data

May 19, 2009 (KR) .................. 10-2009-0043413

(51) Int. Cl.
*G06F 3/048* (2013.01)
*G06F 3/0488* (2013.01)

(52) U.S. Cl.
CPC ........ *G06F 3/04886* (2013.01); *G06F 3/04883* (2013.01)
USPC ........... 715/765; 715/769; 715/783; 715/815; 715/787; 715/830

(58) Field of Classification Search
None
See application file for complete search history.

(56) References Cited

U.S. PATENT DOCUMENTS

| 7,081,882 | B2 | 7/2006 | Sowden et al. | |
|---|---|---|---|---|
| 2003/0020687 | A1 | 1/2003 | Sowden et al. | |
| 2004/0100479 | A1* | 5/2004 | Nakano et al. | 345/700 |
| 2007/0150842 | A1* | 6/2007 | Chaudhri et al. | 715/863 |
| 2008/0074399 | A1 | 3/2008 | Lee | |
| 2009/0271731 | A1* | 10/2009 | Lin et al. | 715/776 |
| 2010/0039399 | A1* | 2/2010 | Kim | 345/173 |
| 2010/0056221 | A1* | 3/2010 | Park | 455/566 |
| 2010/0141684 | A1* | 6/2010 | Machida | 345/661 |
| 2010/0262928 | A1* | 10/2010 | Abbott | 715/769 |
| 2011/0041102 | A1* | 2/2011 | Kim | 715/863 |

FOREIGN PATENT DOCUMENTS

| AU | 2008-201540 | 1/2008 | ............... G06F 3/00 |
|---|---|---|---|
| CN | 201181467 Y | 1/2009 | |
| CN | 101384047 A | 3/2009 | |

(Continued)

OTHER PUBLICATIONS

Apple; "iPhone 3G User Manual;" Jul. 11, 2008; XP 007907619; Rtrvd from Internet: http://manualsi.info.apple.com/en_US/iPhone_User_Guide.pdf; [Rtrvd on Nov. 15, 2012].

(Continued)

*Primary Examiner* — Matt Kim
*Assistant Examiner* — Hua Lu
(74) *Attorney, Agent, or Firm* — Cha & Reiter, LLC

(57) ABSTRACT

Disclosed is a portable terminal operation method and a portable terminal supporting the same that enable rapid and convenient operation of a user function in relation to a particular item on a touch screen. The method includes: outputting an area in which one or more scrollable items are arranged; appointing a particular item when a first touch event occurs, determining if a second touch event occurs on the appointed item within a range in which item scrolling does not occur; and changing at least one of a part of a color, and a shape of an image, corresponding to the appointed particular item according to the occurrence of the second touch event.

19 Claims, 10 Drawing Sheets

(56) References Cited

FOREIGN PATENT DOCUMENTS

| | | | | |
|---|---|---|---|---|
| EP | 1942401 A1 | 7/2008 | | |
| EP | 2116927 A2 | 11/2009 | | |
| JP | 2001069223 A | 3/2001 | | |
| JP | 2002333951 A | 11/2002 | | |
| JP | 2003140802 A | 5/2003 | | |
| JP | 2005-196810 | 7/2005 | ............. | G06F 3/033 |
| JP | 2008084249 A | 4/2008 | | |
| KR | 2007-080918 | 8/2007 | ............... | H04B 1/40 |
| KR | 2007-120368 | 12/2007 | ............. | G06F 3/048 |
| KR | 2008-0109278 | 12/2008 | ............. | G06F 3/048 |
| WO | 2008-025473 A1 | 3/2008 | | |

OTHER PUBLICATIONS

"Particular Tutorial of biteSMS Short Message Tool"; http://iphone.tgbus.com/tutorial/use/200809/20080929080743_2.shtml.

\* cited by examiner

METHOD OF OPERATING A PORTABLE TERMINAL AND PORTABLE TERMINAL SUPPORTING THE SAME

CLAIM OF PRIORITY

This application claims, pursuant to 35 USC 119(a), priority to, and the benefit of the earlier filing date, to that Korean Patent Application No. 10-2009-0043413 filed in the Korean Intellectual Property Office on May 19, 2009, the entire contents of which are incorporated herein by reference.

BACKGROUND OF THE INVENTION

1. Field of the Invention

The present invention relates to the field of portable terminals. More particularly, the present invention relates to a portable terminal operation method and a portable terminal supporting the same, in which a preset user function for an appointed item is activated according to a touch event occurring.

2. Description of the Related Art

Portable terminals, which are terminals supporting various user functions, are being used in a very wide variety of fields due to the convenience in use, the easiness in carrying and mobility. In order to provide user functions, the portable terminals employ various input methods. For example, a conventional portable terminal allows input of predetermined letters or numbers through a keypad, etc., which is disposed at one side of the portable terminal. Further, the portable terminal inevitably has a limited size in order to secure its portability. Especially, in order to secure a display unit having a proper size, a small-sized portable terminal may support a touch screen having a touch panel disposed in a display unit without a keypad.

In the meantime, the conventional portable terminals require various input and output conditions for execution of user functions provided by the terminals. For example, in order to activate a user function based on a particular item, a user of a conventional terminal may generate an input signal for the activation of a menu screen, the identification of the activated menu screen, for the selection of a desired item, or for selection of a user function to be executed based on the selected item. Therefore, the conventional portable terminal is problematic in that it requires the execution of repetitive and unnecessary steps for use of a particular user function.

SUMMARY OF THE INVENTION

The present invention provides a portable terminal operation method and a portable terminal supporting the same, which enables rapid and convenient operation of a user function in relation to a particular item on a touch screen.

In accordance with an aspect of the present invention, a method of operating a portable terminal includes: outputting an area in which one or more scrollable items are arranged; when a first touch event occurs and designates a particular item, determining if a second touch event occurs on the designated item within a range in which item scrolling does not occur; and changing at least a part of a color or a shape of an image corresponding to the designated particular item according to the occurrence of the second touch event.

In accordance with another aspect of the present invention, a portable terminal includes: a touch panel for generating an event according to a touch; a display unit for outputting a screen including an area in which one or more scrollable items are arranged; and a control unit for controlling an image change of the items output in the display unit, wherein the control unit activates a user function linked to a particular item when a first touch event indicating the particular item occurs and a second touch event on the particular item within a range in which item scrolling does not occur.

In a portable terminal operation method and a portable terminal supporting the same according to the present invention, it is possible to rapidly and conveniently perform various user functions relating to an item, which a user wants, without the generation of an additional input signal.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1:
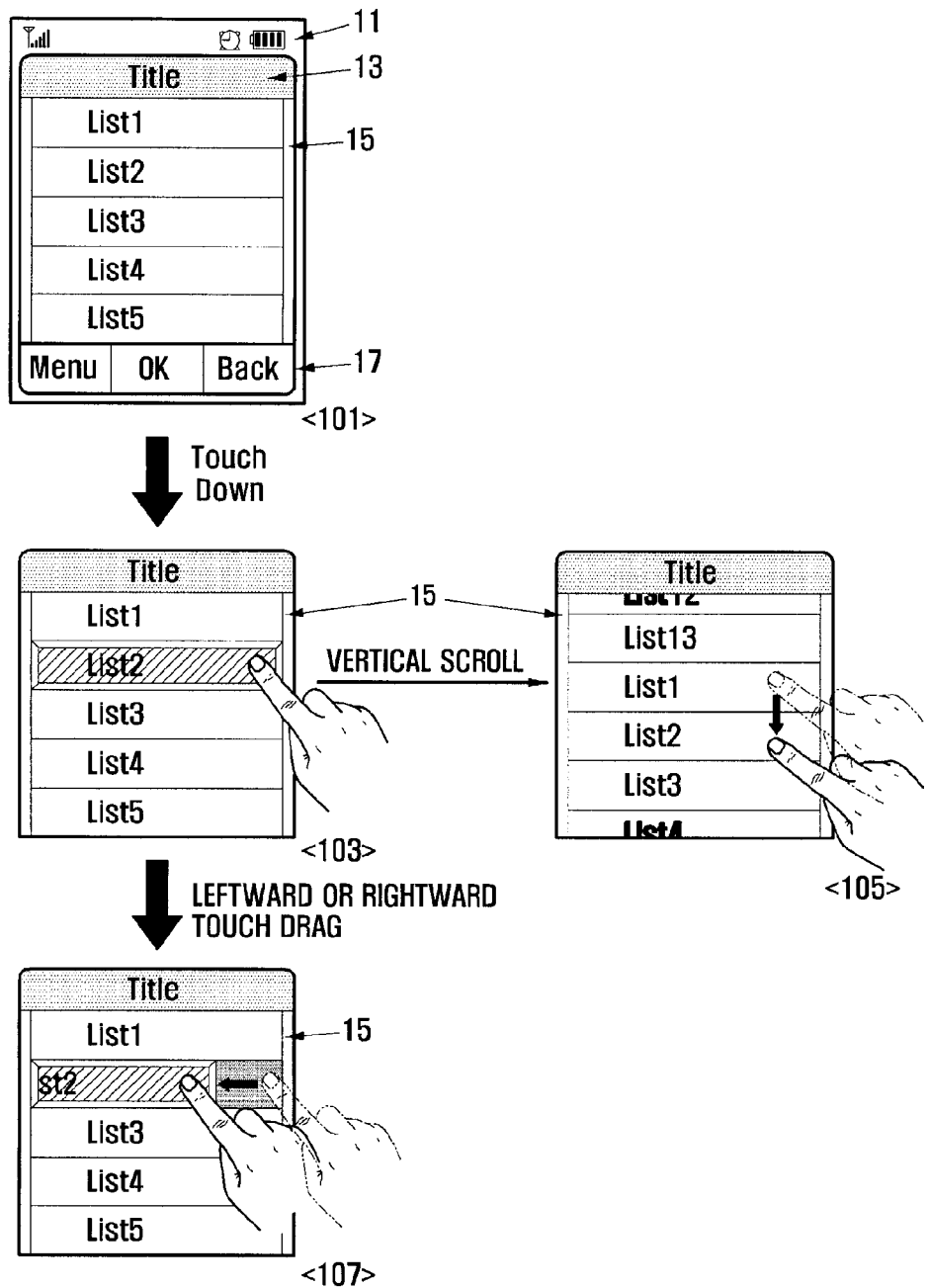
FIG. 1 illustrates an example of a screen for describing user function activation according to an embodiment of the present invention.

Hereinafter, exemplary embodiments of the present invention will be described with reference to the accompanying drawings. In the following description, a detailed description of known functions and configurations incorporated herein will be omitted when it may make the subject matter of the present invention rather unclear.

Terms or words used in the present specification or claims as described hereinafter should not be restrictively interpreted to have only common or literal meanings, and should be interpreted to have meanings and concepts matching the technical idea of the present invention based on the principle that an inventor can properly define his or her invention with a concept capable of describing the invention in the best way. Therefore, it should be understood that the embodiments described in the present specification and the configurations illustrated in the drawings are only the most exemplary embodiments of the present invention and cannot represent all the technical ideas of the present invention, and can be replaced by various equivalents or modifications at the time of the present application.

The "appointment" described below implies the indication and touch of a particular item, such as a menu item, a content item, or a communication log, which is being output to the display unit, and may correspond to a state just before execution of a particular user function based on the particular item. After "appointing" a particular item output to a display unit, a user of the portable terminal can perform generation of an additional input signal, for example, generation of a touch event within a predetermined area defined by the portable terminal, in order to activate a particular user function based on the particular item. The state in which a particular item has been "appointed" may continue when an input signal provided to the particular item is maintained, and may be interrupted when the provided input signal is removed or when an additional input signal is provided after the removal of the initially provided signal. For example, the user may continuously perform a first touch event, for example, a touch-down event, in the area in which the particular item is output, in order to appoint the particular item, or may remove the touch-down event, that is, may generate a touch-up event, in order to interrupt the state of appointment. Further, in order to perform a particular user function based on the "appointed" item, the user may perform an operation for changing the touch-down event provided to the "appointed" item, for example, the user may move, drag, or sweep the "appointed" item within a predetermined range in which a scroll does not occur.

FIG. 1 illustrates exemplary screens for describing an operation of a portable terminal according to an embodiment of the present invention. The following description is based on a portable terminal according to the present invention is a terminal equipped with a touch screen and includes a display unit for displaying a particular screen and a touch panel disposed on the display unit to detect a touch of a user.

Referring to FIG. 1, when power is supplied to a portable terminal, the portable terminal first initializes each configuration included in the portable terminal. When the initialization has been completed, the portable can control signal flow for supporting a touch screen operation method according to the present invention. To this end, a user of the portable terminal can select a particular menu to output a particular screen in which at least one item provided by the portable terminal is arranged. For example, when contents are stored in a storage unit, the user of the portable terminal can identify a screen interface as shown in the screen 101 through content search. Further, as soon as an input signal for a web page search occurs, the portable terminal may output particular web page addresses in the form of a predetermined type of list as shown in the screen 101. The screen 101 includes an indicator area 11 disposed at the upper end of the screen 101, in which an icon indicating the intensity of the signal received by the radio frequency unit, an icon indicating the alarm setting, and an icon indicating the remaining battery power are arranged, a title area 13 displaying a title of a menu of currently activated menu items, a list area 15 displaying the currently activated menu items in a predetermined arrangement, and a control key area 17 for screen shift or menu selection. According to the intention of a designer, characteristics of the portable terminal, and/or taste of the user, the indicator area 11 and the control area 17 may be omitted or partially used in the screen 101. The list area 15 displays an arrangement of multiple menu items including "List1, List2, List3, List4, List5, . . . ". The list area 15 may either additionally display a predetermined area, which has not been displayed in the display unit, in the display unit according to a touch event occurring through the touch screen, or provide a scroll function for moving the menu items displayed in the displayed part in a predetermined direction.

In this state, the user of the portable terminal may require an operation for determining if the menu includes additional items beyond the menu items arranged in the list area 15. To this end, the user may touch a predetermined portion of the list area 15 and then generate a touch event in a predetermined direction, for example, in the vertical direction. During this process, the user of the portable terminal may touch a predetermined item (for example, the area including the item "List2") in the list area 15. Further, the user of the portable terminal can appoint the "List2" item in order to activate a particular user function based on the "List2" item from among the items displayed in the list area 15. In order to appoint the "List2" item, the user of the portable terminal may generate a touch event (for example, a touch down event) in the touch panel area in which corresponding items are arranged. Then, the portable terminal can provide a particular effect (such as particular color or shape) for discriminating the appointed item from the item before the appointment or from the other items, as shown in the screen 103. That is, in order to discriminate the image of the "List2" item from the other items, the portable terminal may display the image of the "List2" item in a particular color, in an inverted state, or with a highlight along the rim of the image. When the portable terminal provides a keypad, the user of the portable terminal may use a direction key or a number key of the keypad in order to appoint the item.

Meanwhile, as described above, in order to identify the additional items provided by the corresponding menu in the screen 103, the user of the portable terminal may generate a touch event for the scrolling function. That is, the user of the portable terminal may perform a touch down event in a predetermined portion (for example, the "List2" item) of the list area 15 as shown in the screen 103, and then move a finger, etc. upward or downward as shown in the screen 105. Then, in response to the occurrence of the touch down event in the list area 15 and the following upward or downward touch-move or touch-drag event in the state in which the touch down event is maintained, the portable terminal may identify the events as an input signal for execution of the scroll function. Then, as shown in the screen 105, the portable terminal performs the scroll function and then changes the screen of the list area 15. In other words, the portable terminal displays additional items, which have not been displayed in the list area 15, on the display unit, and removes the previous items, which have been displayed in the list area 15, for example, the items having been displayed on the upper or lower part of the list area 15, from the screen. While performing the scroll function, the portable terminal may cancel the effect being provided according to the touch of the "List2" item in the screen 103. In other words, the portable terminal may restore the "List2" item, which has been displayed in an inverted state or with a changed shape, for its discrimination from the other items in the screen 103, to the initial state as in the screen 101, and simultaneously move the "List2" item in the list area 15 according to the scroll function.

Meanwhile, the event for performing the scroll function from the screen 103 to the screen 105 is not limited to the touch-move or the touch-drag. That is, the scroll function can be performed by a flick event occurring in a vertical direction. In the meantime, the movement of the list area 15 according to the scroll function may be determined by the movement distance of the touch-move or touch-drag, the acceleration intensity of the flick event, etc., and a movement distance of another list area 15 according to the movement distance and the acceleration intensity may be either fixedly determined or changed by dimensions determined by a designer, conditions set by a user, etc.

In the screen 103, the user having selected the "List2" item may require activation of a particular user function based on the selected item. To this end, as shown in the screen 107, in the state in which the "List2" item has been selected, the user can generate a touch event relating to the "List2" item within a set range in which a scroll does not occur. For example, after appointing the "List2" item, the user of the portable terminal can sweep, move, or drag the appointed "List2" item within the set range. Then, the portable terminal activates a particular user function according to the touch event generated within the set range for the "List2" item. To this end, the portable terminal can set a routine, which enables execution of a particular function when a touch event satisfying a predetermined condition occurs after appointment of an item. For example, the portable terminal can set functions, which enable deletion of the "List2" item, reproduction of the "List2" item, execution of communication based on the "List2" item, edition of the "List2" item, etc. when a predetermined touch event occurs within a set range in which a scroll does not occur in the state in which the "List2" item has been appointed. Such function setting may be either actually provided by a designer or directly performed by a user through an edition window. The range in which a scroll does not occur and the time point for user function activation relating to the appointed item will be described later in more detail with reference to FIG. 11.

Further, the portable terminal may provide an effect, which enables the user to intuitively recognize the touch events occurring in a predetermined direction, to the display unit. For example, when the user touches and drags the "List2" item leftward, the portable terminal may provide a screen displaying leftward movement and disappearance of the image allocated to the "List2" item.

Meanwhile, by using at least a part of the background of the image corresponding to the "List2" item during the leftward movement of the image, the portable terminal can provide a description of a user function being currently performed by the user, which will be described in more detail with reference to FIG. 2.

Figure 2:
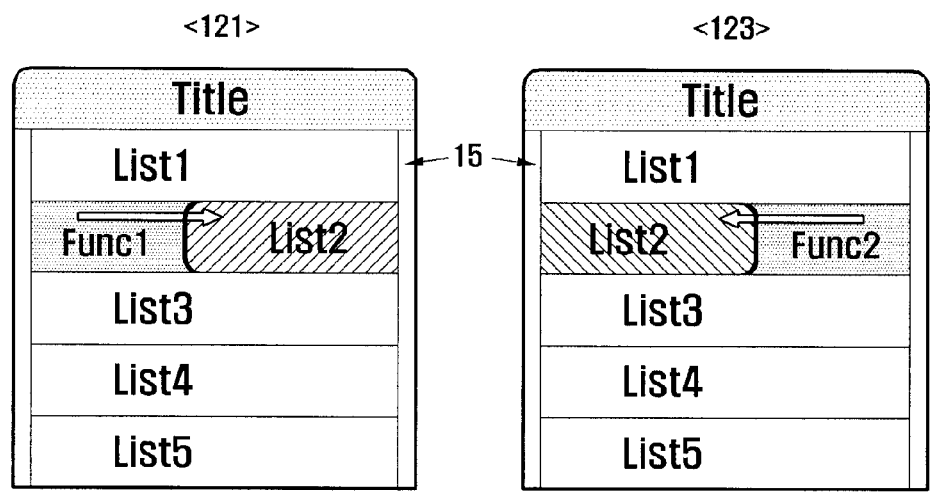
FIG. 2 schematically illustrates an example of a screen interface for supporting the operation of a portable terminal according to an embodiment of the present invention.

FIG. 2 schematically illustrates an example of a screen interface for supporting the operation of a portable terminal according to an embodiment of the present invention.

Referring to FIG. 2, in a screen, which is displaying at least one item in the list area 15, the user of the portable terminal may appoint a particular item, i.e. the "List2" item, and then drag the appointed item rightward, as shown in the screen 121. Then, in response to the user's touch event, the portable terminal can provide an effect of appointment to the "List2" item and an effect of movement of the "List2" item. At this time, the portable terminal may output first function information (Func1), which enables the user to recognize a result of the movement of the "List2" item, on the background of the image corresponding to the "List2" item, which is exposed according to the rightward movement of the "List2" item. That is, the portable terminal may output a description of a user function, which is executed according to the rightward movement of the "List2" item, in the form of text or image on the exposed background. For example, if the "List2" item has been pre-set to be deleted when the "List2" item moves rightward, the portable terminal may output first function information for reporting the deletion of the "List2" item in the form of a text, such as "deletion" or "delete", or an image having a meaning of deletion, such as an image or icon of a wastebasket.

In the meantime, as shown in the screen 123, the user of the portable terminal may drag the image corresponding to the "List2" item leftward after appointing the "List2" item. Then, similar to the screen 121, the portable terminal may provide an effect of appointment to the "List2" item and an effect of movement of the "List2" item according to the touch event of the user. At this time, the portable terminal may output second function information (Func2), which enables the user to recognize a result of the movement of the "List2" item, on the background of the image corresponding to the "List2" item, which is exposed according to the leftward movement of the "List2" item. That is, the portable terminal may output a description of a user function, which is executed according to the leftward movement of the "List2" item, in the form of text or image on the exposed background. For example, if the "List2" item has been pre-set to be edited when the "List2" item moves leftward, the portable terminal may output second function information (Func2) for reporting the editing of the "List2" item in the form of a text, such as "editing" or "edit", or an image that may be interpreted as indication an editing operation.

The exposed background of the screen 121 and the exposed background of the screen 123 may have either the same color and the same shape, or different colors and different shapes in order to enhance the intuitive power for discrimination thereof from execution of other user functions.

As described above, a portable terminal according to an embodiment of the present invention can support rapid execution of a user function based on an item according to a touch event occurring within a predetermined range in which a scroll does not occur in an area in which at least one item having a scroll function is disposed. Therefore, the user can process a user function relating to a particular item within one screen and need not perform unnecessary screen shift or input signal generation. Thus, more convenient terminal operation is made available to the user.

Figure 3:
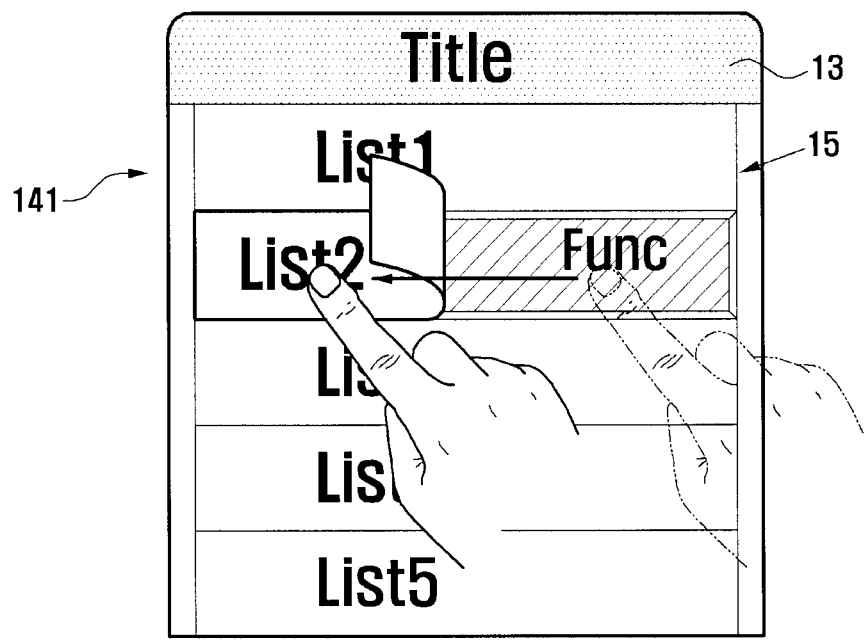
FIG. 3 illustrates a screen for describing an effect according to movement of an item in a screen interface according to a first embodiment of the present invention.

FIG. 3 illustrates a screen for describing an effect according to movement of an item in a screen interface according to a first embodiment of the present invention.

Referring to FIG. 3, a display unit 141 of the portable terminal according to an embodiment of the present invention may include a title area 13 and a list area 15. As shown, the list area 15 includes one or more menu items in a predetermined arrangement. In this state, if the user of the portable terminal generates a touch event within a predetermined range in which a scroll does not occur based on a particular item as described above, the portable terminal can activate a user function set for the particular item. At this time, the portable terminal provides a pre-set effect according to a touch event provided for the particular item by the user. For example, on an assumption that the user has appointed the "List2" item and has generated a second touch event of leftward movement, for example, a leftward touch drag event, on a touch panel corresponding to the area in which the particular item has been output, the portable terminal can change at least one of the color and shape of a predetermined part of the "List2" item according to the occurrence of the touch drag event. Specifically, the portable terminal may display a shape in which a boundary part of the image corresponding to the "List2" item is turned over or stripped off in a direction following the progression of the touch drag event. When the "List2" item has a rectangular shape, the height difference between the right end of the image corresponding to the "List2" item and the background gradually increases while the right end of the image corresponding to the "List2" item moves leftward. At this time, the right end of the image corresponding to the "List2" item may move in a leftward and upward direction while hiding a part of another item adjacent to the "List2" item, for example, a part of the area in which the "List1" item is displayed.

Although the height difference between the right end of the image and the background gradually increases in the above description, the present invention is not limited to this description. That is, the height difference between the right end of the image corresponding to the "List2" item and the background may gradually increase up to a predetermined distance from the point where it is separated from the background, and may be maintained constant. Then, the exposed area in the background may increase according to the leftward movement of the right end of the image of the "List2" item.

The movement of the right end of the image may correspond to the touch drag event. That is, the distance and the speed of the movement of the right end of the image may change according to the dragged distance and the dragging speed of the touch drag event.

In the meantime, in the changing of the image corresponding to the "List2" item according to the present invention, not only can the right end of the image be separated from the background and then moved leftward, but also the left end of the image may be separated from the background and then moved rightward. To this end, the user may generate a leftward touch event within a range in which a scroll does not occur, after appointing the "List2" item.

Further, the portable terminal can output function information (Func) corresponding to a user function executed according to the changing of the image of the "List2" item at a portion in the background, which is exposed according to the changing of the image of the "List2" item. This function information (Func) may be different according to the direction (left or right) of the changing of the image and can be changed by the user or the designer.

Figure 4:
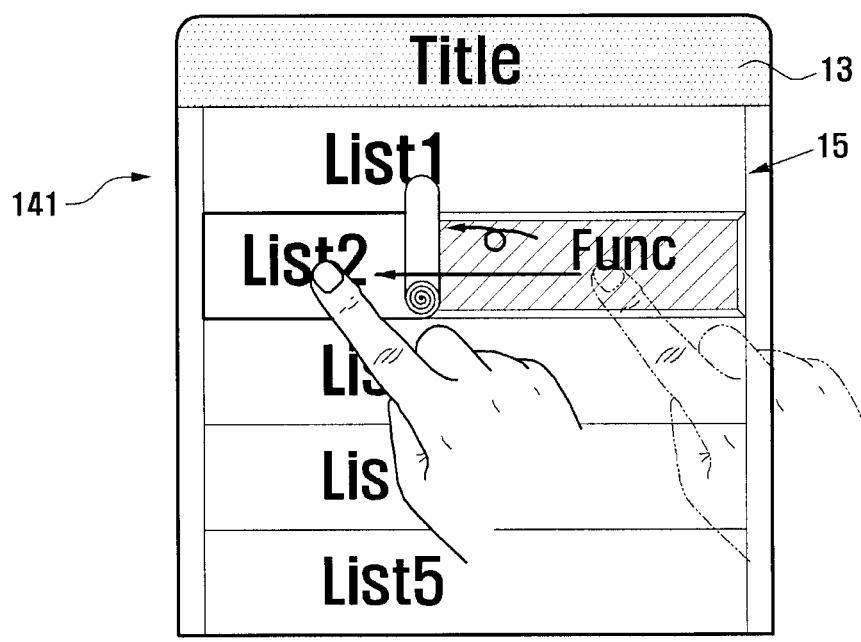
FIG. 4 illustrates a screen for describing an effect according to movement of an item in a screen interface according to a second embodiment of the present invention.

FIG. 4 illustrates a screen for describing an effect according to movement of an item in a screen interface according to a second embodiment of the present invention.

Referring to FIG. 4, the display unit 141 of the portable terminal according to an embodiment of the present invention includes a title area 13 and a list area 15. As shown, the list area 15 includes one or more menu items in a predetermined arrangement therein. In this state, if the user of the portable terminal generates a touch event within a predetermined range in which a scroll does not occur based on a particular item as described above, the portable terminal can activate a user function set for the particular item. At this time, as illustrated, the user has appointed the "List2" item and has generated a touch event of a leftward movement, for example, a leftward touch drag event, on a touch panel corresponding to the area in which the particular item has been output, the portable terminal can change a predetermined part of the "List2" item according to occurrence of the touch drag event. Specifically, the portable terminal may display a shape in which a predetermined part of the image corresponding to the "List2" item is rolled in a direction following the progression of the touch drag event. That is, when the image of the "List2" item has a rectangular shape, the right end of the image of the "List2" item is separated from the background and is then moved leftward. At this time, the right end of the image is moved a predetermined distance away from the background with a gradual increase in the height difference and the angle between the right end of the image and the background. Then, the right end of the image and the part connected to the right end are sequentially rolled counterclockwise like a roll cake. In other words, the image of the "List2" item is gradually rolled in the direction in which the touch drag event progresses. As the touch drag event progresses leftward, the quantity of the part rolled counterclockwise increases. At this time, exposed viewable area of the background, which was covered by the image of the "List2" item, increases in proportion to the quantity of the part rolled. Further, function information (Func) corresponding to a user function executed according to the changing of the image of the "List2" item may be output at a portion in the background.

Although the above description employs a leftward touch drag event as an example, the present invention is not limited to the described event. That is, the portable terminal of the present invention may change a predetermined portion of the image corresponding to the "List2" item according to the touch drag event occurring rightward, wherein the predetermined portion may be a left end or a left portion. Further, function information (Func), which is the same as, or different from, the function information displayed on the right portion of the background, may be displayed on the left portion of the background.

Figure 5:
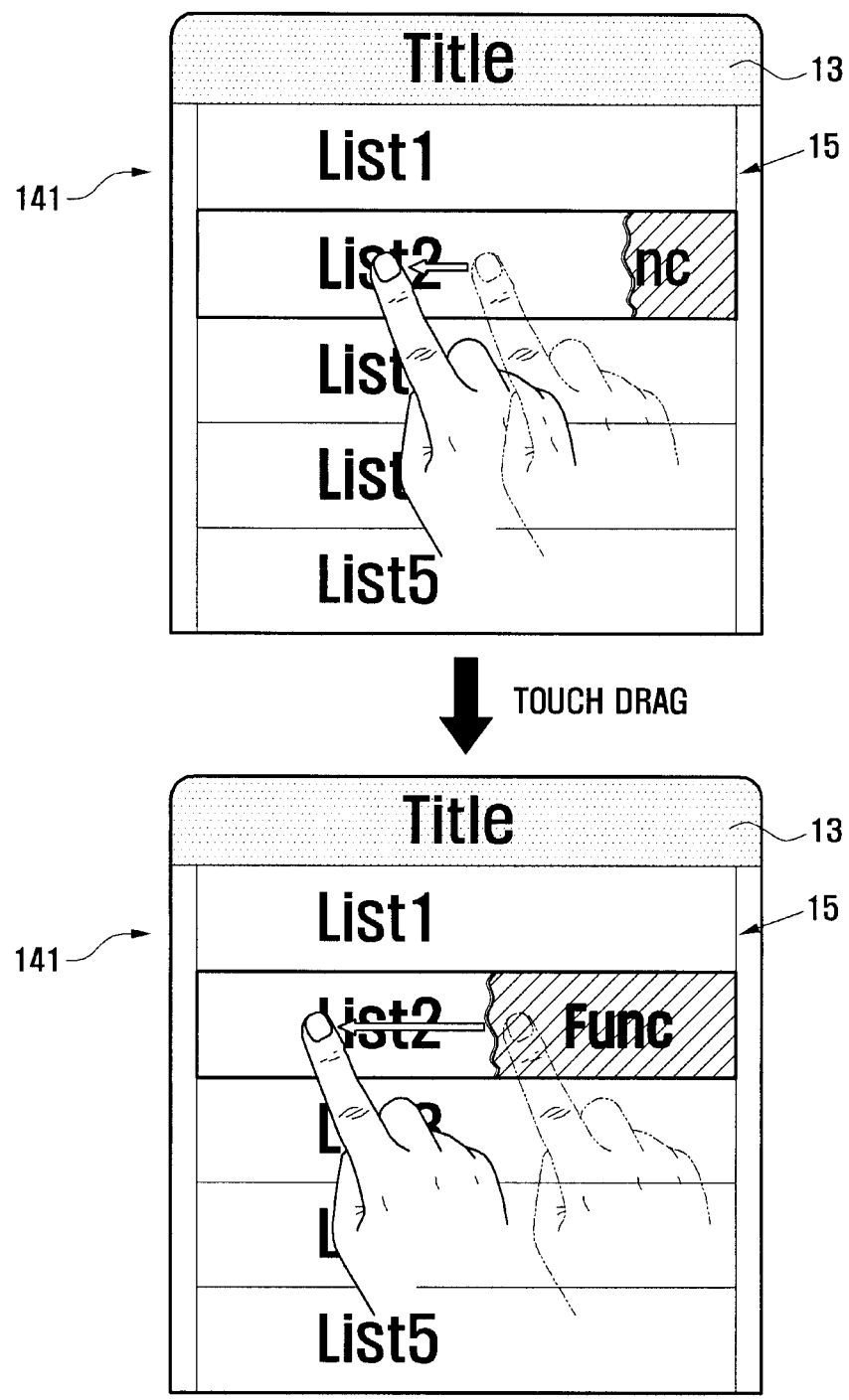
FIG. 5 illustrates a screen for describing an effect according to movement of an item in a screen interface according to a third embodiment of the present invention.

FIG. 5 illustrates a screen for describing an effect according to movement of an item in a screen interface according to a third embodiment of the present invention.

Referring to FIG. 5, the display unit 141 of the portable terminal according to an embodiment of the present invention includes a title area 13 and a list area 15. As shown, the list area 15 includes one or more menu items in a predetermined arrangement therein. In this state, if the user of the portable terminal generates a touch event within a predetermined range in which a scroll does not occur based on a particular item as described above, the portable terminal can activate a user function set for the particular item. At this time, on an assumption that the user has appointed the "List2" item and has generated a touch event of leftward movement, for example, a leftward touch drag event, on a touch panel corresponding to the area in which the particular item has been output, the portable terminal can change a predetermined part of the "List2" item according to occurrence of the touch drag event. Specifically, the portable terminal may display a shape in which a predetermined portion of the image corresponding to the "List2" item is removed according to the touch drag event. That is, when the "List2" item has a rectangular shape, the image corresponding to the "List2" item may be gradually removed leftward from the right end while the touch event occurs in the leftward direction. At this time, the portable terminal may gradually expose the background of the image according to the gradual removal of the image. The speed and the shape of the image removed from the list area may depend on the speed and the distance of the touch drag event. An effect for appointing (indicating) that the removal of the image is in progress may be expressed in the portion after the removal within the background. For example, the right end of the image may be expressed by a waveform line as shown, or the removed part of the image may be expressed as scattered sand particles gradually becoming smaller and disappearing.

In the meantime, while the background hidden by the image corresponding to the "List2" item is gradually exposed, the portable terminal may expose the function information (Func), which has been allocated to be output on the background. At this time, since the function information (Func) may be gradually exposed according to the quantity, by which the image is removed, only a part of the function information (Func) may be exposed when the distance of the touch drag event is not long enough.

Figure 6:
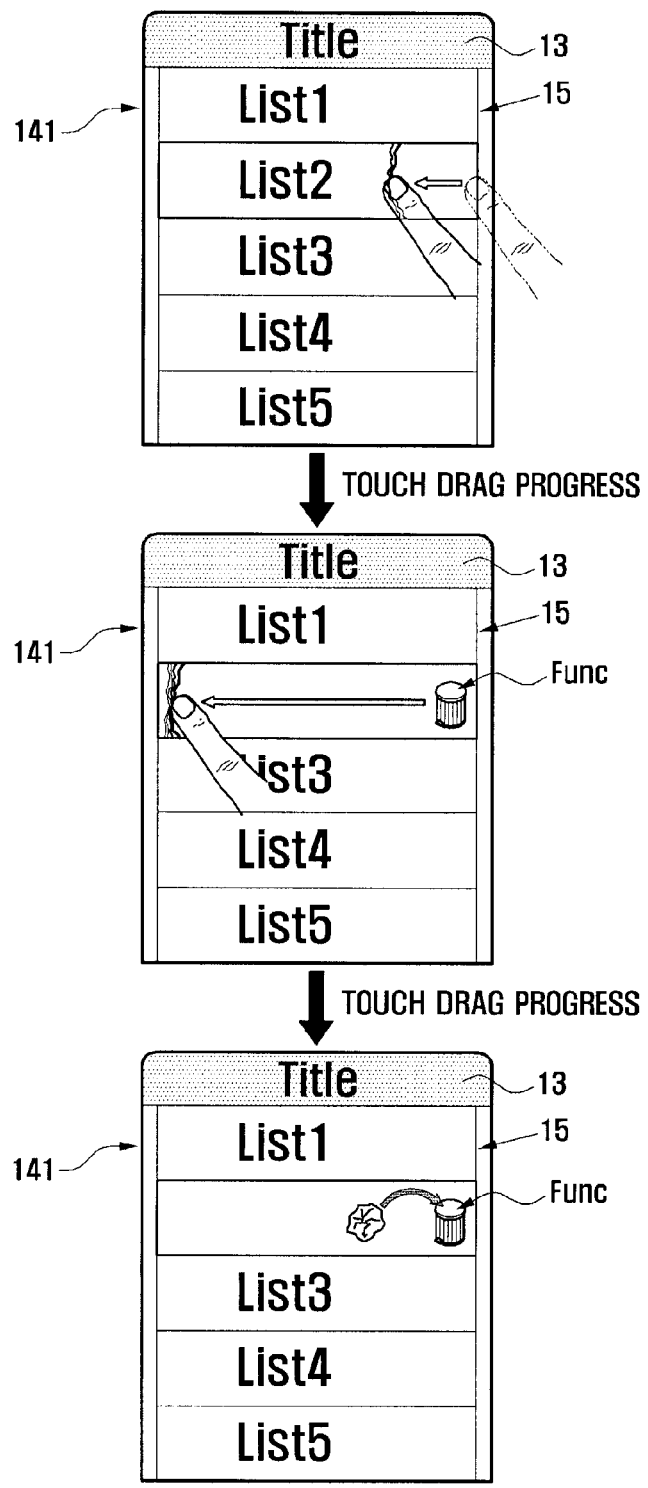
FIG. 6 illustrates a screen for describing an effect according to movement of an item in a screen interface according to a fourth embodiment of the present invention.

FIG. 6 illustrates a screen for describing an effect according to movement of an item in a screen interface according to a fourth embodiment of the present invention.

Referring to FIG. 6, the display unit 141 of the portable terminal according to an embodiment of the present invention includes a title area 13 and a list area 15. As shown, the list area 15 includes one or more menu items in a predetermined arrangement therein. In this state, if the user of the portable terminal generates a touch event within a predetermined range in which a scroll does not occur based on a particular item as described above, the portable terminal can activate a user function set for the particular item. At this time, as illustrated, the user has appointed the "List2" item and has generated a touch event of leftward movement, for example, a leftward touch drag event, on a touch panel corresponding to the area in which the particular item has been output, the portable terminal can change a predetermined part of the "List2" item according to an occurrence of the touch drag event. Specifically, the portable terminal may display a shape in which a predetermined portion of the image corresponding to the "List2" item is crumpled according to the touch drag event. That is, when the "List2" item has a rectangular shape, the image corresponding to the "List2" item may be gradually crumpled leftward from the right end while the touch event occurs in the leftward direction. At this time, the portable terminal may gradually expose the background of the image according to the gradual crumpling of the image. The speed and the shape of the image crumpled from the list area may depend on the speed and the distance of the touch drag event. Further, the crumpled part of the image may increase as the touch drag event progresses leftward. That is, when the touch drag event has not progressed a long distance as shown in "A", the quantity of the crumpled part of the image is small. In contrast, when the touch drag event has progressed a relatively long distance as shown in "B", the quantity of the crumpled part of the image may be relatively greater. Further, while the touch drag event is moving leftward, and the event goes beyond a preset threshold or the image area of the "List2" item, the portable terminal may express the image of the "List2" item in the form of a crumpled wad of paper as shown in "C".

In the meantime, the portable terminal may output the function information (Func) in the background area, which is gradually exposed according to the gradual crumpling of the image of the "List2" item, wherein the function information (Func) may be expressed in the form of an icon or a particular image. For example, when the function information (Func) corresponds to "deletion", the portable terminal may display an image or icon of a wastebasket on the exposed background.

Further, in order to remove the image of the crumpled wad, the user of the portable terminal may appoint the image and drag the image into the "wastebasket" icon. Therefore, in a screen in which one or more items are arranged, the user of the portable terminal can appoint a particular item and can directly perform a particular user function without a screen shift, so that the user can manage the list and use the user functions in a very convenient and rapid manner.

Although the user's operation of touching and dragging the image into the "wastebasket" in order to "delete" the "List2" item is described above, the portable terminal may automatically move the image of the crumpled wad into the "wastebasket" and "delete" it even when there is a shift from the state of "B" to the state of "C" without a separate touch drag event. Further, when the user releases the touch drag event before exceeding the preset threshold from the state of "B", for example, when the user performs a touch up event, the portable terminal may restore the original image of the "List2" item while uncrumpling the crumpled image.

Figure 7:
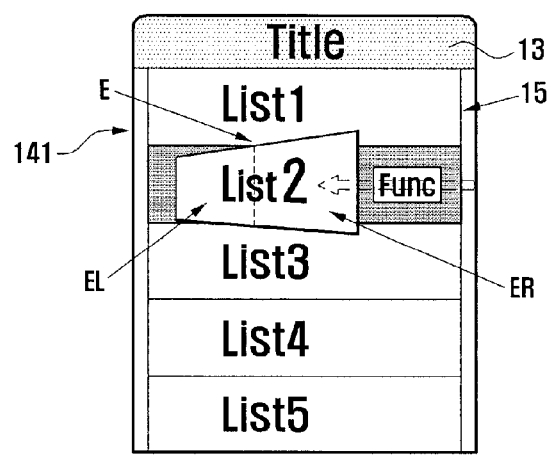
FIG. 7 illustrates a screen for describing an effect according to movement of an item in a screen interface according to a fifth embodiment of the present invention.

FIG. 7 illustrates a screen for describing an effect according to movement of an item in a screen interface according to a fifth embodiment of the present invention.

Referring to FIG. 7, the display unit 141 of the portable terminal according to an embodiment of the present invention includes a title area 13 and a list area 15. As shown, the list area 15 includes one or more menu items in a predetermined arrangement. In this state, if the user of the portable terminal generates a touch event within a predetermined range in which a scroll does not occur based on a particular item as described above, the portable terminal can activate a user function set for the particular item. At this time, as illustrated the user has appointed the "List2" item and has generated a touch event corresponding to a leftward movement, i.e., a leftward touch drag event, on a touch panel corresponding to the area in which the particular item has been output, the portable terminal can change a predetermined part of the "List2" item according to occurrence of the touch drag event. Specifically, the portable terminal may display a shape in which the image corresponding to the "List2" item rotates around a predetermined axis within an allocated area. That is, when the "List2" item has a rectangular shape, the image corresponding to the "List2" item may rotate leftward about a predetermined axis E while the touch event occurs in the leftward direction. At this time, the left part of the image may rotate backward into the background about the axis E while the right part of the image may rotate forward out of the background about the axis E, so that the entire image can rotate leftward. During this process, in order to express a perspective, the height of the left side EL of the image may gradually decrease in the leftward direction from the axis E, while the height of the right side ER of the image may gradually increase in the rightward direction from the axis E. Further, the portable terminal may output the function information (Func) performed according to the changing of the image in a portion of the background, which is gradually exposed according to the gradual rotation of the image of the "List2" item. Although the function information (Func) is displayed at the right side background of the image in FIG. 7, it may be displayed either at the left side background of the image or at both the left side background and the right side background of the image.

The above description on the image rotation according to the leftward touch drag event is also applicable to a rightward touch drag event. That is, when the user generates a rightward touch drag event, the portable terminal may display an image that rotates rightward about the axis E. Further, function information (Func), which is equal to or different from the function information output in the background at the time of the leftward rotation, may be output in the portion of the background exposed according to the rotation of the image.

Further, the portable terminal may activate the user function explained in the function information (Func) when the image has rotated more than a particular angle, for example, an angle between 60 degrees and 90 degrees based on the section of the background. Also, the portable terminal may display the rotation quantity of the image according to the speed and the distance of the touch drag event, and may restore the image into the original state, in which the background is not exposed, when the touch event is released before the rotation of the image exceeds a preset threshold angle.

Figure 8:
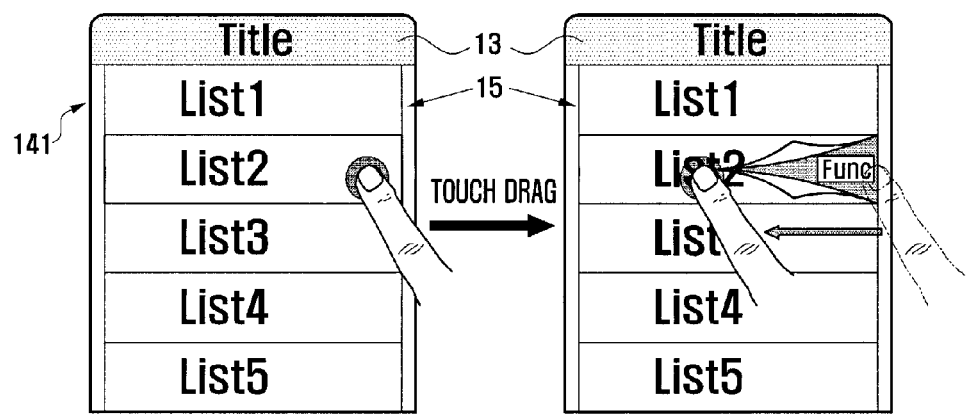
FIG. 8 illustrates a screen for describing an effect according to movement of an item in a screen interface according to a sixth embodiment of the present invention.

FIG. 8 illustrates a screen for describing an effect according to movement of an item in a screen interface according to a sixth embodiment of the present invention.

Referring to FIG. 8, the display unit 141 of the portable terminal according to an embodiment of the present invention includes a title area 13 and a list area 15. As shown, the list area 15 includes one or more menu items in a predetermined arrangement. In this state, if the user of the portable terminal generates a touch event within a predetermined range in which a scroll does not occur based on a particular item as described above, the portable terminal can activate a user function set for the particular item. At this time, again as previously described, the user has appointed the "List2" item and has generated a touch event of leftward movement, i.e., a leftward touch drag event, on a touch panel corresponding to the area in which the particular item has been output, the portable terminal can change a predetermined part of the "List2" item according to occurrence of the touch drag event. Specifically, the portable terminal may display a shape in which the rectangular image of the "List2" item is divided into at least two areas and the divided areas are moved in different directions while exposing the background according to the progress of the touch drag event. At this time, the image looks like it is being cut in half and the halves are moved away from each other, while gradually exposing the background, on which function information (Func) as described above may be output.

In summary in relation to the change in at least one of the color and the shape of an image of an appointed item through screen interfaces according to embodiments of the present invention, a display unit according the present invention separates a side end of the image from a background of the image and moves the separated side end away from the background according to the progress of a touch drag event, under the control of a control unit. At this time, the height difference between the separated side end and the background gradually increases. When the separated side end of the image has been moved more than a predetermined distance, the background is exposed and the image is turned over or ripped off in the direction in which the touch drag event progresses.

Also, the display unit of the present invention may separate the right end of the image from the background and then roll the image counterclockwise. In other words, the image of the appointed item is gradually rolled in the direction in which the touch drag event progresses. As the touch drag event progresses leftward, the quantity of the part rolled counterclockwise increases, and the exposed area of the background increases in proportion to the quantity of the part rolled.

Moreover, under the control of the control unit, the display unit of the present invention may remove at least one of the color or shape of the image allocated to a portion of the image of the appointed item according to the progress of the touch drag event. Under the control of the control unit, the display unit of the present invention may display a shape in which a predetermined portion of the image from the event start point to a current event contact point is separated from the background and crumpled in a predetermined shape according to the progress of a touch drag event on the image. When the touch drag event has progressed over a predetermined threshold, the display unit may display a preset image.

Further, according to the progress of the touch drag event, the display unit of the present invention may display a shape in which a part of the image may move backward around a predetermined portion of the image, which serves as a central axis, while decreasing a height of an end of the backward-moving part, and the other part of the image may rotate forward around the same predetermined portion of the image as the central axis while increasing a height of an end of the forward-moving part, under the control of the control unit.

Moreover, under the control of the control unit, the display unit of the present invention may display a shape in which the image of the item is divided into at least two areas and the divided areas are moved in different directions according to the progress of the touch drag event, thereby showing a splitting of the image.

Meanwhile a screen interface of a portable terminal according to an embodiment of the present invention can provide not only the image changes as described above but also a wider variety of image changes. For example, although FIG. 5 shows an image change of gradually removing the color and the shape of the image according to the touch drag event, it is possible to remove only the color of the image, so that the item has a transparent or semi-transparent image and the user can identify the background of the image through the transparent or semi-transparent image. At this time, text information or image information relating to a user function may be output on the background. In result, when the user of the portable terminal appoints a particular item, the user can directly identify the function information displayed on the background through the transparent or semi-transparent image, and can touch and drag the item in the direction toward the displayed function information, which enables rapid activation of the user function.

Meanwhile, the time point at which the changed image is restored to the original image before the change may be determined by conditions set by a designer or a user from among a time point when the touch drag even is released before the touch drag event passes a threshold set in the image, a time point after the touch drag event has passed the threshold set in the image, a time point when the touch drag even is released, a time point when the touch drag even is moved beyond a range in which a scroll does not occur before the touch drag event passes the threshold set in the image, and a time point when the touch drag even is moved beyond the range in which a scroll does not occur.

As described above, a screen interface for an operation of a portable terminal according to an embodiment of the present invention displays one or more items scrollable by a user and supports rapid execution of a user function based on a particular item without a screen shift when the user generates a touch event on the particular item in a preset range in which a scroll does not occur.

Meanwhile, the display effect provided when a touch event occurs on an item appointed by a user within a predetermined range in which a scroll does not occur may be either applied to all the items displayed on one screen in an uniform manner or may be applied to each item individually.

The above description discusses screen interfaces for an operation according to an embodiment of the present invention. Hereinafter, the construction of a portable terminal for supporting the screen interface will be described in detail.

Figure 9:
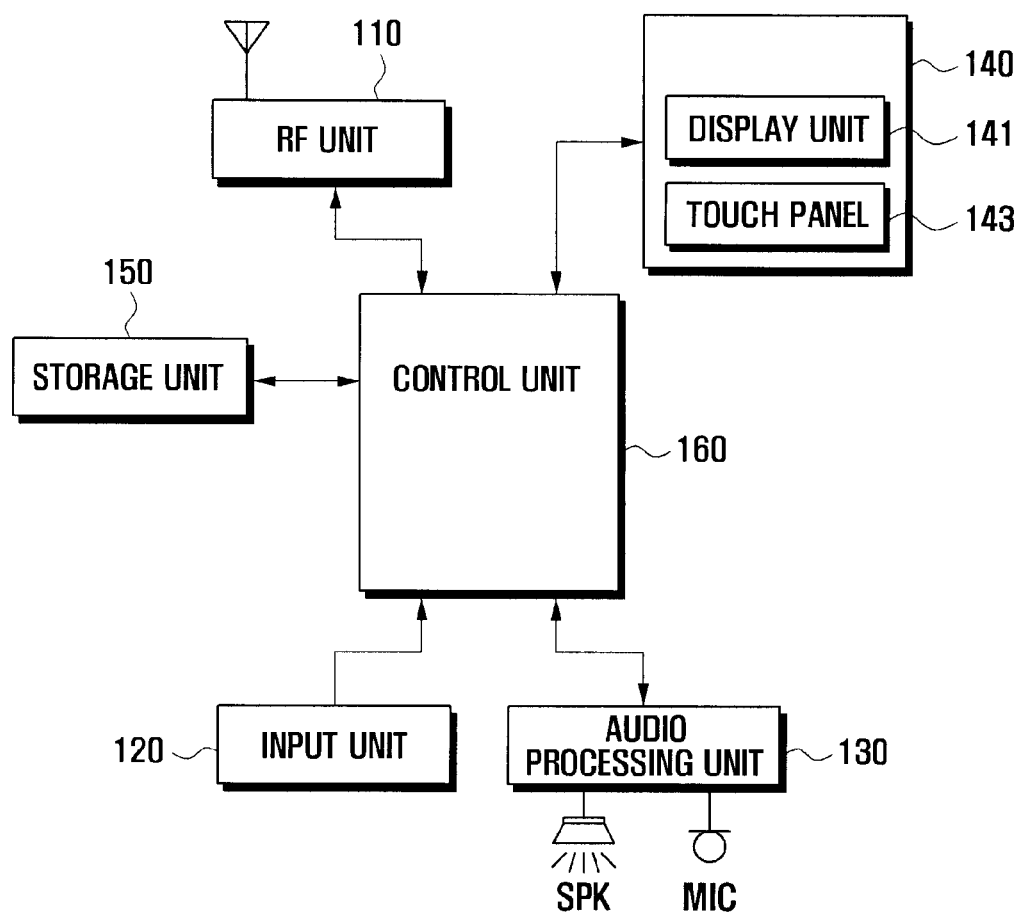
FIG. 9 is a block diagram illustrating the construction of a portable terminal according to an embodiment of the present invention.

FIG. 9 is a block diagram illustrating the construction of a portable terminal according to an embodiment of the present invention.

Referring to FIG. 9, the portable terminal includes a Radio Frequency (RF) unit 110, an input unit 120, an audio processing unit 130, a touch screen 140, a storage unit 150, and a control unit 160.

A portable terminal having the construction described above according to the present invention can support direct execution, without an additional screen shift, of a user function for a particular item appointed by a user according to a touch event occurring in a predetermined range in which a scroll does not occur in an area in which one or more scrollable items are arranged. The user function is a function that can be supported by the particular item and can be changed by the designer or the user. To this end, the portable terminal can provide an additional editing menu or screen for change of the user function. Hereinafter, the construction of the portable terminal will be described in more detail.

The RF unit 110 establishes a communication channel for voice communication and a communication channel for transmission of data, image, etc. under the control of the control unit 160. That is, the RF unit 110 may establish one or more of a voice communication channel, a data communication channel, and an image communication channel between mobile communication systems. To this end, the RF unit 110 includes an RF transmission unit for up-converting and amplifying a frequency of a transmitted signal and an RF reception unit for low-noise-amplifying and down-converting a frequency of a received signal. The RF unit 110 may be selected according to the touch event generated by the touch panel 143 under the control of the control unit 160. Especially, the RF unit 110 of the present invention can be provided in the form of a menu icon or an image. When the RF unit 110 together with other functions is provided in the form of a list, the portable terminal supports execution of a function appointed by a touch event of the user as described above. For example, in a menu screen in which an image corresponding to the RF unit 110 is arranged together with other images, if a user selects an image corresponding to the RF unit 110 and generates a touch event within a range in which a scroll does not occur, the portable terminal can enable execution of a preset user function based on the RF unit 110. During this process, the portable terminal may output a screen necessary for a user function relating to the RF unit 110, such as a phone book screen, a message input screen, an e-mail input screen, a communication log screen, and a messenger function supporting screen.

The input unit 120 includes multiple input keys for receiving input of number or character information and multiple function keys for setting functions. Further, the input unit 120 generates a key signal relating to user setting and function control of the portable terminal and transfers the key signal to the control unit 160. When the touch screen 140 of the portable terminal is a full touch screen, the input unit 120 may be omitted and replaced by the touch screen 140.

The audio processing unit 130 includes a speaker SPK for reproducing audio data transmitted and received during the communication and a microphone MIC for collecting user's voice or other audio signals during the communication. While each image is changed in the screen interface as described above, the audio processing unit 130 may output an audio signal corresponding to the image. For example, while a part of the image is crumpled as shown in FIG. 6, the audio processing unit 130 may output an audio signal corresponding to the crumpling of paper. Also, when the image rotates as shown in FIG. 7, the processing unit 130 may output an audio signal corresponding to a sound of air friction. Moreover, the audio processing unit 130 may output an audio signal proper for each image change, which may be set by a designer or newly set or changed by the user. Further, the audio processing unit 130 may output a voice signal reporting the user function. That is, when a predetermined touch event relating to a particular item occurs within a range in which a scroll does not occur, the audio processing unit 130 may output a voice signal reporting a user function to be executed due to the touch event. For example, when a leftward touch drag event in relation to a particular item occurs, the audio processing unit 130 may output a voice signal reporting the user function set for the particular item, for example, saying "delete", under the control of the control unit 160.

The touch screen 140 includes a display unit 141 and a touch panel 143. The touch screen 140 may have a construction in which the touch panel 143 is located in front of the display unit 141. The size of the touch screen 140 may be determined by the size of the touch panel 143.

The display unit 141 displays various menu items of the portable terminal, information input by the user, and information provided to the user. That is, the display unit 141 may provide various screens according to the use of the portable terminal, such as a standby screen, a menu screen, a message input screen, and a communication screen. Especially, the display unit 141 of the present invention outputs a screen displaying one or more scrollable items, and can provide an appointment effect according to appointment of an item in the screen, an image change effect corresponding to the touch event occurring in the appointed item, a background effect of the background exposed according to the image change, and a screen corresponding to activation of a particular user function relating to the appointed item. Various screen interfaces output by the display unit 141 have been described above, so a detailed description thereof will not be made here again. The display unit 141 may be made by a Liquid Crystal Display (LCD), an Organic Light Emitting Diode (OLED), etc. The display unit 141 may have a small size in comparison with the touch panel 143 and may be disposed under the touch panel 143.

The touch panel 143 is disposed to cover the display unit 141. According to a contact or an approach of an object, the touch panel 143 may generate a touch event and transfer the generated touch event to the control unit 160. At this time, the touch panel 143 is arranged in the form of a matrix, and transfers location information and type information of a touch event occurring on the touch panel 143 to the control unit 160. According to the types of the touch events, the touch events include a touch down event generated by a contact between an object and the touch panel, a touch up event generated when the contact is released, a touch move or touch drag event generated by moving the contact of the touch down state in a predetermined direction, and a flick event generated by moving the contact of the touch down state in a predetermined direction at an accelerated speed. The control unit 160 identifies the location information and the touch event type based on the touch event transferred from the touch panel 143, identifies a particular image mapped to a corresponding position of the display unit, and then activates a user function linked to the image.

The storage unit 150 stores not only application programs necessary for the operation of functions according to embodiments of the present invention but also a key map or menu map for the operation of a touch screen when the portable terminal includes the touch screen. The key map or menu map may have various forms. That is, the key map may be a keyboard map, a 3*4 key map, a QWERTY key map, or a control key map for operation and control of a currently activated application program. Further, the menu map may be a menu map for the control of a currently activated application program or a menu map including various menu items provided by the portable terminal. The storage unit 150 as described above may include a program area and a data area (not shown).

The program area may store an Operation System (OS) for booting the portable terminal and operating each element of the portable terminal and application programs for reproducing various files, such as an application program for supporting a communication function of the portable terminal, a web browser for access to an Internet server, an MP3 application program for reproducing other sound sources, an image output application program for reproducing a photograph, etc., and a moving image reproducing application program. Especially, the program area of the present invention includes a touch operation program for supporting the touch function, and the touch operation program includes a control routine for scrolling at least one item currently displayed on the screen according to the touch event generated for the scroll function, a control routine for activating a user function having been set in the appointed item according to generation of a touch event in a direction that does not cause a scroll, and other control routines necessary for other touch operations. Further, the program area may include a change routine of an image corresponding to the appointed item according to a generated touch event.

The data area, in which data generated according to use of the portable terminal is stored, may store phone book information, at least one icon according to a widget function, and various contents. Further, when the display unit 140 is a touch screen, the data area may store a user input given through the touch screen. Especially, when a touch event relating to a particular item occurs, the data area of the present invention may store the types of user functions to be executed. For example, the data area may store information linking a particular item to at least one user function from among various user functions including "delete", "edit", "transfer", and "draw-up". When there are multiple items, the data area may store one or more user functions to be executed according to the touch event in relation to the multiple items in the form of a table.

The control unit 160 supports initialization of each element of the portable terminal. When the initialization has been completed, the control unit 160 can control signal flow for providing a user function according to the present invention for each element. In more detail, in a state in which one or more items are scrollably arranged in the display unit 141, when a particular item is appointed and a predetermined touch event then occurs within a range in which a scroll does not occur, the control unit 160 may refer to a table stored in the data area. Further, the control unit 160 may notify the user function to be executed by the user's setting in relation to the appointed item, in the form of text information, an icon, image information, or sound information as described above. Thereafter, when the touch event progresses beyond a threshold for activation of the user function, the control unit 160 may activate the user function based on the appointed item. During this process, under the control of the control unit 160, an effect relating to the appointed item may be displayed according to a preset condition.

Figure 10:
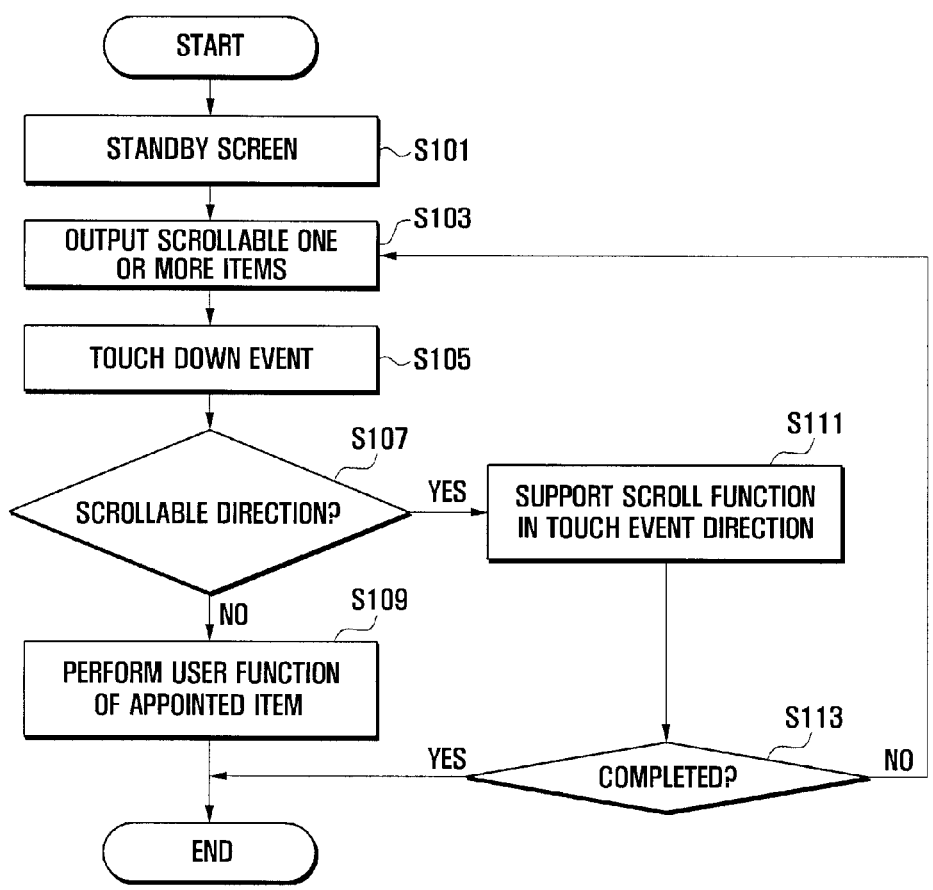
FIG. 10 is a flowchart for describing a method for operation of a portable terminal according to an embodiment of the present invention.

FIG. 10 is a flowchart for describing a method for operation of a portable terminal according to an embodiment of the present invention.

Referring to FIG. 10, as soon as the power is supplied, the portable terminal of the present invention initializes elements of the portable terminal, and displays a predetermined standby screen on the display unit in step S101. During this process, the portable terminal may continuously output the standby screen on the display unit even when it is activated again after transition into a sleep state due to non-use thereof during a predetermined period of time. Further, when the display unit is activated, the portable terminal may activate a touch panel according to user's setting to be ready for detection of a user's touch.

Also, upon receiving an input signal generated through an input unit by a user or upon detecting activation of a particular application program by a touch event through a touch screen, the portable terminal may output a screen according to the activation of the particular application program. That is, when the application program is an application program including one or more scrollable items, the portable terminal outputs a screen including the scrollable item or items in response to the input signal or the touch event in step S103.

Then, in step S105, when a touch down event occurs, the portable terminal provides an effect capable of discriminating the item appointed by the touch down event from other items. For example, the portable terminal may provide various effects to an image of the appointed item in which the touch down event has been generated, for example, the portable terminal may paint the image with a color different from the previous color, invert a shade of the image, or highlights a periphery of the image.

Next, in step S107, the portable terminal determines if the touch event has occurred in a scrollable direction. As a result of the determination, when the touch event has occurred in an un-scrollable direction, the portable terminal proceeds to step S109, in which the portable terminal may perform a user function relating to the appointed item according to the generated touch event. Here, when one user function is linked to the appointed item, the portable terminal can perform the user function after reporting the user function in the form of text information, an icon or image, or a voice signal, regardless of the direction of the touch event. Further, when multiple user functions are linked to the appointed item and a leftward touch drag event, a rightward touch drag event, or a leftward-rightward touch drag (sweep) event occurs, the portable terminal may report the user function for execution of the user function. Here, the portable terminal may support a screen shift according to the user function. For example, when the user function is an editing function for editing the appointed item, the portable terminal may display an editing screen which enables editing of the item.

Meanwhile, as a result of the determination in step S107, when the touch event has occurred in a scrollable direction, for example, when the touch event has occurred in the upward or downward direction, the portable terminal proceeds to step S111, in which the portable terminal can support the function of scrolling in the direction of the touch event on the appointed item. Thereafter, in step S113, the portable terminal determines if the touch event has been completed. As a result of the determination, when there is no separate input signal for the completion, the portable terminal proceeds to step S103 and repeatedly performs the above process after step S103.

Although multiple items are arranged and are scrollable in the vertical direction in the screen interfaces described above, the present invention is not limited to the described interfaces. That is, the portable terminal may support an interface in which multiple items are arranged and are scrollable in the horizontal direction. In this case, when a touch drag event occurs in the vertical direction within a range in which a scroll does not occur, the portable terminal may report a predetermined user function and activate the user function.

Figure 11:
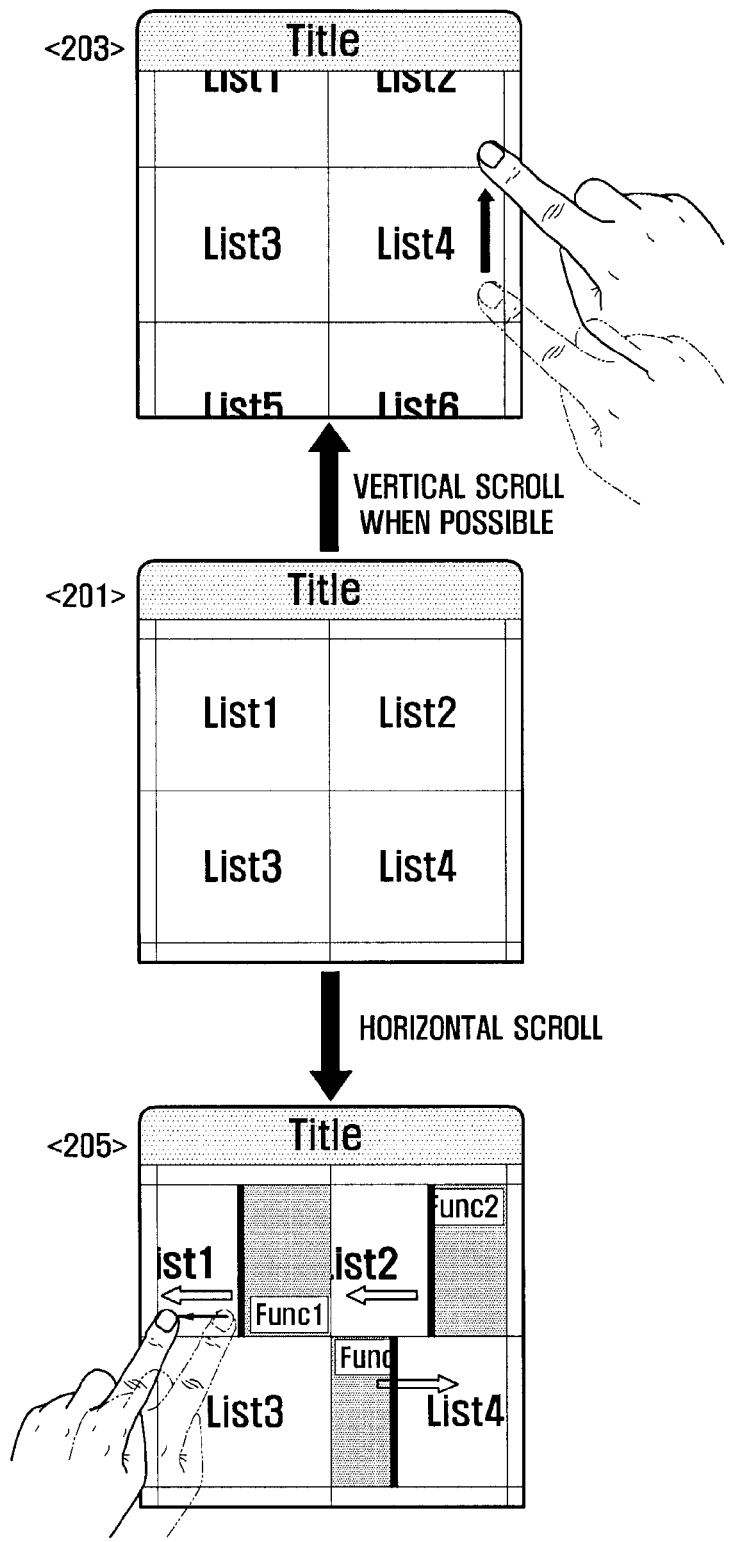
FIG. 11 illustrates screens for describing a method of activating a user function in a screen in which items are arranged in the form of a grid.

Further, when multiple items are arranged in the form of a grid as shown in the screen 201 of FIG. 11 and a touch event occurs in a scrollable direction, the portable terminal may support a scroll function in a scrollable direction, for example, in the vertical direction as shown in the screen 203.

Further, when the touch event occurs in an un-scrollable direction, for example, in the horizontal direction, the portable terminal supports execution of a preset user function appointed through the touch event of the user on the appointed item, as shown in the screen 205. At this time, the portable terminal can provide various display effects for the appointed item and can report the user function as described above.

Meanwhile, when the user appoints a particular item in the screen 201, the portable terminal may display an image for notifying that leftward or rightward touch drag is possible together with an effect according to the user's appointment. For example, the portable terminal may display an image of an arrowhead capable of appointing a direction around or within the image of the appointed item.

Figure 12:
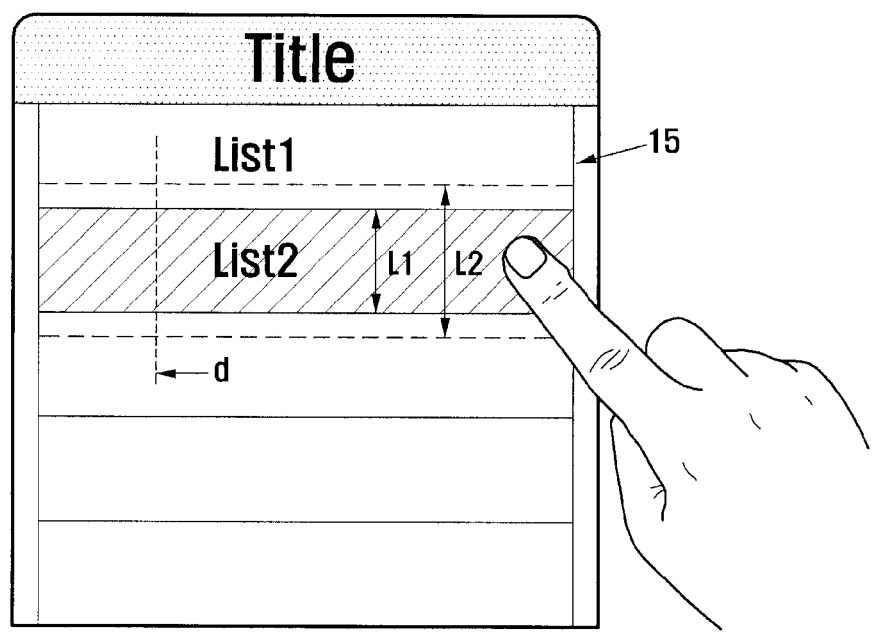
FIG. 12 illustrates a screen for describing boundary points of an item according to an embodiment of the present invention.

FIG. 12 illustrates a screen for describing boundary points of an item according to an embodiment of the present invention.

Referring to FIG. 12, in the list area 15, an image of an appointed item according to the present invention occupies an area having a height of L1, and an area in which the scroll is not generated has a height of L2, which is larger than L1. When the user appoints the "List2" item, the area having a height of L1 serves as an area for discriminating the "List2" item from un-appointed items, and the portable terminal sets portions of the area having a height of L2, which remains after subtracting the area having a height of L1 from the area having a height of L2, as guard areas. Then, if the touch event of the user of the portable terminal occurs in an area outside of the area having a height of L2, for example, in the "List1" area or "List3" area outside of the area having a height of L2, the portable terminal recognizes the occurred touch event as a touch event for scrolling and supports activation of the scroll function. According to the activation of the scroll function, the portable terminal releases the appointed state of the item and restores the appointed item to its original state before the appointment.

Meanwhile, when a leftward or rightward touch drag event occurs within a range in which the scroll is not generated, the portable terminal may provide an effect of changing the image of the touch event for execution of a user function while notifying the user function, as described above. Further, when the touch event for execution of the user function proceeds beyond the threshold point "d" or when a touch release event occurs after proceeding beyond the threshold point "d", the portable terminal may activate the user function set for the item. The threshold point may be adaptively changed in response to the image change effect, and may be changed according to the point at which the touch event has occurred. More specifically, when the touch drag event as shown in FIGS. 1 to 5 proceeds beyond the point "d" as shown in FIG. 12, the portable terminal may perform the user function. Further, the portable terminal may activate the user function when the touch drag event has proceeded up to the right end or the left end as shown in FIG. 6. Further, the portable terminal may activate the user function when the touch drag event proceeds beyond the rotation axis E as shown in FIG. 7. Meanwhile, the portable terminal may move the point "d" leftward or rightward with respect to the point at which the touch down event has occurred. Further, the portable terminal may apply the point "d" regardless of the point at which the touch down event has occurred.

Further, the portable terminal may change the image as a display effect preset for occurrence of a touch drag event for activation of a user function. In a state in which a touch drag event has occurred by a predetermined distance, which does not exceed the point "d" that determines the point for activation of the user function, when the touch drag event progresses beyond the range in which the scroll does not occur, or when a touch release event, such as a touch up event, occurs, the portable terminal may restore the changed image to the original image. Further, in the case where the portable terminal is designed or set to activate the user function when the touch drag event has progressed beyond the point "d" and a touch release event occurs, if the touch drag event progresses outside of the range in which the scroll does not occur, that is, outside of the area having a height of L2, even after having progressed beyond the point "d", the portable terminal does not activate the user function and cancel the image change effect for the item.

In summary, the portable terminal may cancel the image change effect in at least one of the cases including: when the touch drag event progresses beyond a threshold set in the image of the appointed item; when the touch drag event is released after progressing beyond the threshold set in the image of the appointed item; when the touch drag event goes out of a range in which the scroll does not occur, before progressing beyond the threshold set in the image of the appointed item; and when the touch drag event goes out of the range in which the scroll does not occur after progressing beyond the threshold set in the image of the appointed item.

Meanwhile, in a screen in which one or more scrollable items are arranged, when a particular item is appointed, the portable terminal may provide a particular image that enables a user to intuitively determine if it is possible to perform a function of the particular item. That is, if the user appoints a particular item through a touch down event and the appointed item is an item allowing execution of one user function from among various user functions, the portable terminal can display an effect showing that the appointed item is an item allowing execution of a user function. For example, the portable terminal may highlight the periphery of the item or display a character for indicating that leftward or rightward touch drag of the item is possible. Further, if the appointed item is an item, to which no function to be executed has been allocated, such as a simple phone number, which is not related to a calling function or a message input function, the portable terminal may display an image for notifying that execution of the function is not possible. For example, the portable terminal may draw dots around the periphery of the item or display an indicating image within the image of the item that a function execution is not possible. Further, when the item is an item that does not allow execution of a particular function, such as calling or message writing, the portable terminal may display a message reporting that execution of a function is not possible or only a function, such as "delete," is allowed. To this end, the portable terminal may store a menu characteristic of the page screen on which the items are being displayed, and information on the functions, which can be set in relation to the items included in the page screen. For example, when a communication-related page screen is output, the portable terminal can determine if the phone numbers allocated to the items included in the output page screen are valid phone numbers and if the phone numbers are appointed by the user. That is, when the phone number is an incomplete number, such as "1004" or "7979", or is a phone number starting from a number set by the user, such as "070-xxx-xxxx", the portable terminal may inhibit a touch drag on the item or may allow a function displayed on the background to be automatically set as the particular function.

As described above, in a portable terminal operation method and apparatus, and a screen interface supporting the same according to the present invention, it is possible to rapidly perform various user functions relating to an item, without a screen change in a screen in which one or more items are arranged.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

Although exemplary embodiments of the present invention have been described in detail hereinabove, it should be clearly understood that many variations and modifications of the basic inventive concepts herein described, which may be apparent to those skilled in the art, will still fall within the spirit and scope of the exemplary embodiments of the present invention as defined in the appended claims.

What is claimed is:

1. A method performed by a portable terminal, the method comprising:
    displaying one or more scrollable items in a foreground of a screen;
    appointing a particular item when a first touch event is performed on the particular item;
    responsive to a touch drag as a second touch event performed on the appointed item continuously from the first touch event, and within a range in which item scrolling does not occur, outputting, during progression of the touch drag, at least one of text information, icon information, and image information in a background of the screen in an area where the touch drag has progressed, and executing a user function in response to the touch drag as the second touch event progressing beyond a threshold, without receiving another touch action; and
    changing at least one of a color and a shape of an image corresponding to the appointed item according to the occurrence of the first touch event or the second touch event;
    wherein the at least one of the text information, icon information, and image information describes the user function.

2. The method of claim 1, wherein the executed user function is a function preset for the appointed particular item according to the occurrence of the second touch event.

3. The method of claim 2, wherein the touch drag causes movement of a portion of the appointed particular item in at least one direction as the touch drag progresses.

4. The method of claim 3, wherein, the executed user function is a function selected from a plurality of different user functions that are activate-able according to a direction in which the touch drag event progresses.

5. The method of claim 3, wherein the threshold is set in the image corresponding to the appointed particular item.

6. The method of claim 5, wherein the threshold is located at a position, which is adjusted according to a location where the touch event has occurred, within an area of the image.

7. The method of claim 1, further comprising canceling the change of the image according to progression of the touch drag event, wherein cancellation occurs after determining at least one of:
    the touch drag event is cancelled before the touch drag event progresses beyond a threshold set in the image corresponding to the appointed item;
    the touch drag event is cancelled after the touch drag event progresses beyond the threshold set in the image corresponding to the appointed item;
    the touch drag event progresses out of the range, in which item scrolling does not occur, before the touch drag event progresses beyond the threshold set in the image corresponding to the appointed item; and
    the touch drag event progresses out of the range, in which item scrolling does not occur, after the touch drag event progresses beyond the threshold set in the image corresponding to the appointed item.

8. The method of claim 1, wherein changing at least one of a part of a color or a shape of the image comprises, according to progression of the touch drag event at least one of:
    separating one end of the image corresponding to the appointed particular item from a background of the image, and moving the image toward another end opposite to said one end while exposing the background and gradually increasing a height between said one end and the background so that the image is turned over in a direction in which the touch drag event progresses;
    separating one end of the image corresponding to the appointed particular item from a background of the image, and rolling the image toward another end opposite to said one end while exposing the background so that the image is rolled in a direction in which the touch drag event progresses;
    gradually removing at least one of a color or a shape of at least a part of the image corresponding to the appointed particular item;
    instantly removing at least one of a color or a shape of at least a part of the image corresponding to the appointed particular item;
    crumpling a part of the image from one end thereof to a current position of the touch drag event, and displaying a preset image on the background when the touch drag event has progressed beyond a threshold;
    rotating the image about an axis by moving one side of the image backward into the background and an opposite side of the image forward out of the background so that a height of said one side gradually increases and a height of said opposite side gradually decreases; and
    dividing the image into at least two areas and moving the divided areas in different directions while exposing the background.

9. The method of claim 1, further comprising at least one of:
    exposing at least a part of the background of the image according to change of the image; and
    outputting a voice signal describing the user function.

10. The method of claim 1, wherein the range, in which item scrolling does not occur, has an area larger than the area of the image corresponding to the appointed particular item.

11. The method of claim 10, wherein the range, in which item scrolling does not occur, has an area including a part of an adjacent item area when images of multiple items are arranged adjacent to each other.

12. The method of claim 1, further comprising displaying items other than the particular item, for which the user function executed for the particular item is not executed, in a discriminating manner than that of the particular item.

13. A portable terminal comprising:
    a touch panel for generating a touch event according to a touch;

a display unit for displaying one or more scrollable items in a foreground of a screen; and a control unit for controlling an image change of the one or more scrollable items displayed by the display unit, detecting when a first touch event appointing a particular item is performed, and responsive to a touch drag as a second touch event performed on the appointed item continuously from the first touch event, and within a range in which item scrolling does not occur, outputting at least one of text information, icon information, and image information in a background of the screen in an area where the touch drag has progressed, and for changing at least one of a color and a shape of an image corresponding to the appointed item according to the occurrence of the first touch event or the second touch event;

wherein the at least one of the text information, icon information, and image information describes a user function to be automatically performed without another touch action responsive to the touch drag progressing beyond a threshold.

14. The portable terminal of claim 13, wherein the first touch event is a touch down event making contact with the touch panel, and the touch drag of the second touch event moves a contact point of the touch down event in a predetermined direction within the range in which item scrolling does not occur, while maintaining the touch down event.

15. The portable terminal of claim 14, wherein the control unit changes a color or a shape of an image corresponding to the appointed particular item according to progression of the touch drag event, and the control unit performs according to progression of the touch drag event, at least one of:

separating one end of the image corresponding to the appointed particular item from a background of the image, and moving the image toward another end opposite to said one end while exposing the background and gradually increasing a height between said one end and the background so that the image is turned over in a direction in which the touch drag event progresses;

separating one end of the image corresponding to the appointed particular item from a background of the image, and rolling the image toward another end opposite to said one end while exposing the background so that the image is rolled in a direction in which the touch drag event progresses;

gradually removing east one of a color or a shape of at least a part of the image corresponding to the appointed particular item;

instantly removing at least one of a color or a shape of at least a part of the image corresponding to the appointed particular item;

crumpling a part of the image from one end thereof to a current position the touch drag event, and displaying a preset image on the background when the touch drag event has progressed beyond a threshold;

rotating the image about an axis by moving one side of the image backward into the background and an opposite side of the image forward out of the background so that a height of said one side gradually increases and a height of said opposite side gradually decreases; and dividing the image into at least two areas and moving the divided areas in different directions while exposing the background.

16. The portable terminal of claim 15, wherein the control unit cancels the change of the image according to progression of the touch drag event, wherein cancellation is determined by the occurrence at least one of:

the touch drag event is cancelled before the touch drag event progresses beyond a threshold set in the image corresponding to the appointed image;

the touch drag event is cancelled after the touch drag event progresses beyond the threshold set in the image corresponding to the appointed image;

touch drag event progresses out of the range, in which item scrolling does not occur, before the touch drag event progresses beyond the threshold set in the image corresponding to the appointed image; and the touch drag event progresses out of the range, in which item scrolling does not occur, after the touch drag event progresses beyond the threshold set in the image corresponding to the appointed image.

17. The portable terminal of claim 15, wherein, when at least a part of the background of the image is exposed according to, change of the image, the control unit outputs a voice signal describing the user function.

18. The portable terminal of claim 14, wherein the control unit activates preset different user functions according to a direction in which the touch drag event progresses.

19. The portable terminal of claim 14, wherein the control unit causes items other than the particular item, for which the user function executed for the particular item is not executed, to be displayed in a discriminating manner than that of the particular item.

* * * * *

UNITED STATES PATENT AND TRADEMARK OFFICE
CERTIFICATE OF CORRECTION

| | | |
|---|---|---|
| PATENT NO. | : 8,910,068 B2 | Page 1 of 1 |
| APPLICATION NO. | : 12/776619 | |
| DATED | : December 9, 2014 | |
| INVENTOR(S) | : Hyun Kyung Shin et al. | |

It is certified that error appears in the above-identified patent and that said Letters Patent is hereby corrected as shown below:

In the Claims

Column 22, Claim 15, Line 1 should read as follows:
--...removing at least one...--

Column 22, Claim 15, Line 8 should read as follows:
--...current position of the...--

Column 22, Claim 17, Line 39 should read as follows:
--...to change of the...--

Column 22, Claim 19, Line 44 should read as follows:
--...claim 18, wherein the...--

Signed and Sealed this
Nineteenth Day of May, 2015

Michelle K. Lee
*Director of the United States Patent and Trademark Office*